March 8, 1966  A. P. HAUEL  3,239,383
FUEL CELL PROCESS
Filed Aug. 15, 1961  5 Sheets-Sheet 1
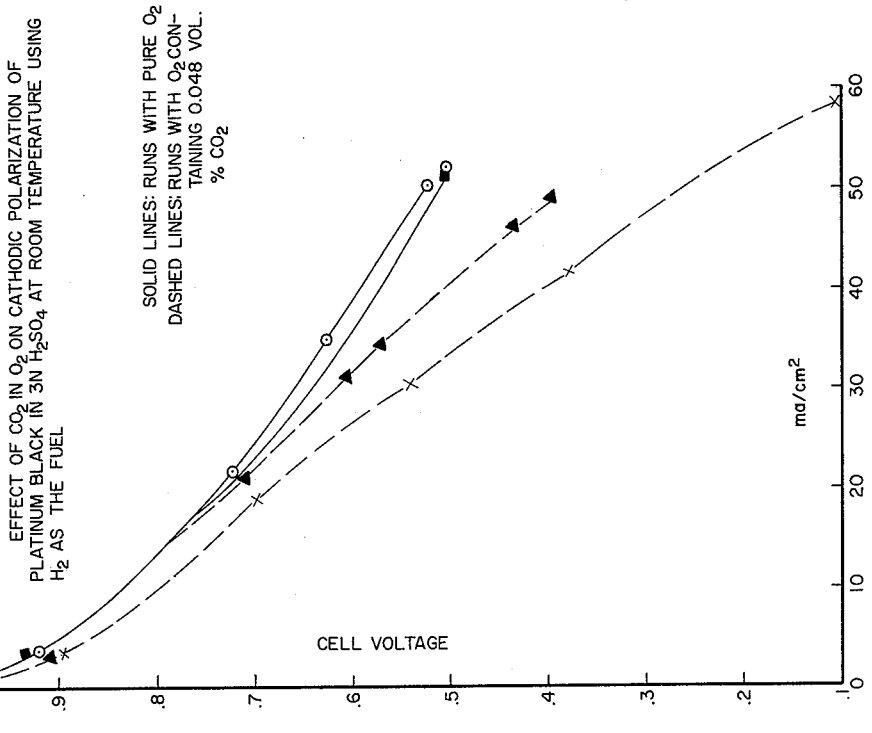
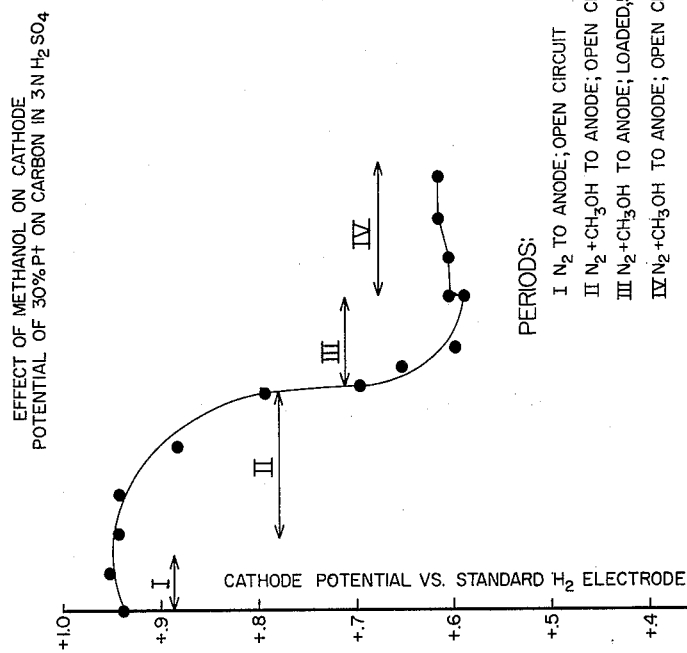

March 8, 1966 A. P. HAUEL 3,239,383
FUEL CELL PROCESS
Filed Aug. 15, 1961 5 Sheets-Sheet 3

ALTERNATE PERIODS
OF
OPEN & CLOSED CIRCUIT

| | | |
|---|---|---|
| 0–40 | MINUTES– | OPEN CIRCUIT |
| 40–50 | " | – CURRENT GENERATION |
| 50–70 | " | – OPEN CIRCUIT RECOVERY |
| 70–80 | " | – CURRENT GENERATION |
| 80–105 | " | – OPEN CIRCUIT RECOVERY |

CATHODE: 10% Pt ON C
ELECTROLYTE: IN $H_2SO_4$ AND MEMBRANE
FUEL: BENZENE VAPOR ON $N_2$

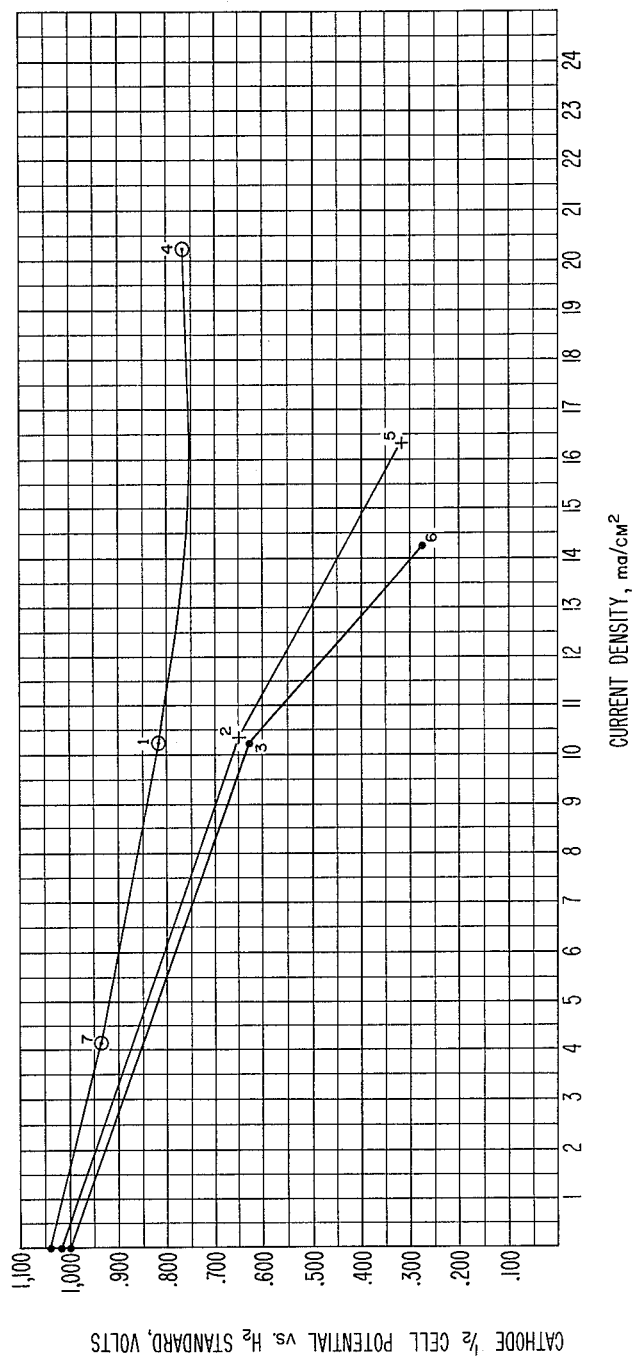

United States Patent Office 3,239,383
Patented Mar. 8, 1966

3,239,383
FUEL CELL PROCESS
Anna P. Hauel, West Orange, N.J., assignor to Engelhard Industries, Inc., Newark, N.J., a corporation of Delaware
Filed Aug. 15, 1961, Ser. No. 131,525
3 Claims. (Cl. 136—86)

This invention relates to fuel cells and more particularly to fuel cells containing a platinum group metal catalyst and an electrolyte containing no free base in which carbon dioxide is prevented from contacting the cathode during operation.

In a fuel cell, fuel is fed to the anode and an oxidizing material, which is usually a gas containing free oxygen, is fed to the cathode. Reaction at the cathode is understood to involve the electrochemical ionization of such oxygen with electrons reaching the cathode. A suitable cathode catalyst is one which promotes this electrochemical ionization of oxygen, and platinum group metal catalysts have been found to be especially suitable where acid or neutral electrolytes are used.

Normally, carbon dioxide is not considered a poison for precious metal catalysts and, in addition, it has been observed that carbon dioxide has no detrimental effect on the anode potentials. In view of this it was unexpected that carbon dioxide has a detrimental effect on the cathode potential.

If carbon dioxide is present as a connate impurity in the oxygen containing feed to the cathode, e.g. where air is the source of oxygen, carbon dioxide may be removed from the feed by known methods, e.g. by the passage of the air through Ascarite (NaOH-Asbestos) or a caustic solution. In oxygen containing feeds having as little as 0.048% carbon dioxide, the carbon dioxide has been found to exert a detrimental effect on the cathode potential and an increase in carbon dioxide concentration results in a corresponding adverse effect on the cathode potential.

Poisoning of platinum group metal catalysts resulting from the presence of carbon dioxide may also be due to the presence of materials in admixture with it since carbon dioxide from tanks containing liquid carbon dioxide has been found to vary in its poisoning effect on such catalysts. Upon purging more volatile material out of such a tank, the poisoning effect of the carbon dioxide has been reduced. Further, the poisoning of a catalyst by carbon dioxide from a source of combustion may be partially due to the presence of nitrogen oxides. Also, fermentation carbon dioxide is likely to contain partially oxidized organic materials, which may be catalyst poisons.

Where a carbonaceous fuel (anodic feed) is the source of the carbon dioxide, i.e., where the carbonaceous fuel, or intermediate oxidation products thereof, or mixture thereof, penetrates the cell to the cathode and is oxidized chemically on the cathode catalyst, the carbon dioxide and the intermediate products of oxidation may be prevented from affecting the cathode potential by a suitable selection of a fuel and electrolyte combination, or the proper selection of a cathode catalyst.

The fuel-electrolyte combination could be selected so that the fuel is not miscible with the electrolyte, e.g., benzene is immiscible with sulfuric acid electrolyte. The cathode catalyst, which must be active for the electrochemical ionization of oxygen, must have additional characteristics. It could be so active for the chemical oxidation of the fuel that the carbon dioxide and other products of oxidation would not interfere with the cathode potential—or the cathode catalyst could exhibit so little activity for the chemical oxidation of the fuel that the cathode potential would not be adversely affected.

Examples of catalysts which are very active for the electrochemical ionization of oxygen and, in general, are not subject to the detrimental effect of the processes which lead to $CO_2$ formation, are catalysts composed of lead and platinum black and of gold and platinum black. The amount of lead to platinum black may range from 0.1% to 10%. The amount of gold to platinum black may range up to 10%.

An example of a less active catalyst is 1% palladium on carbon powder. This catalyst has little activity for the chemical oxidation of the carbonaceous fuel but permits the electrochemical oxygen ionization. Generally speaking, however, when using catalysts of lower activity for the chemical oxidation of carbonaceous fuels, such as 1% palladium or carbon, the cathode potential is at a lower level than if a more active catalyst, such as platinum black, is used.

A catalyst may be used which contains a deactivator for the chemical oxidation of the carbonaceous fuel without adversely affecting the electrochemical ionization of the oxygen.

The invention will be further illustrated by reference to the accompanying drawings in which—

FIGURE 1 is a graphical presentation of the effect on the cathode potential when methanol is used as the fuel in a fuel cell in which the cathode catalyst is 30% platinum on carbon and the electrolyte is 3 N sulfuric acid. The fuel cell employed to obtain the data of FIGURE 1 was that disclosed in copending application Serial No. 103,687. Cathode performance is shown at open circuit and when the cell is producing current. The oxidation of the fuel at the cathode is not electrochemical and, therefore, occurs at both open circuit and when the cell is producing current.

FIGURE 2 is a graphical illustration of data obtained using the same fuel cell as was used in obtaining the data of FIGURE 1 showing the relationship between the decline in cathode potential and carbon dioxide concentration. The qualitative observations on the carbon dioxide in the cathode exhaust when the methanol was fed at the anode were made by passing the cathode effluent through a scrubber containing a barium hydroxide solution. From the 355 to 360 minute period, in which a substantial amount of carbon dioxide was added with the oxygen at the cathode, the cathode potential decline was greater than when 0.6% carbon dioxide was added, in the 365 to 370 minute period.

FIGURE 3 is a graphical illustration of the effect of a small concentration of carbon dioxide in the oxygen feed, i.e. specifically oxygen containing 0.048 volume percent carbon dioxide, on the cell performance in a hydrogen-oxygen fuel cell of the type disclosed in copending application Serial No. 103,687. While the cathodic polarization is not pronounced, the effect increases with current density and, therefore projecting the effect to fuel cells that can be operated at several hundred ma./cm.$^2$, the presence of even small ratios of carbon dioxide is likely to have a marked effect. Although atmospheric air normally contains approximately 0.03 volume percent carbon dioxide, it contains only approximately 21 volume percent oxygen. Therefore, if air is used as the source of oxygen for the fuel cell, the ratio of carbon dioxide to oxygen would be greater than that used in FIGURE 3.

FIGURE 6 is a graph, in which cathode potential is plotted against current density, showing the improved performance of a cathode in a fuel cell when carbon dioxide, and associated impurities, are removed from the cathode feed prior to contact with the cathode.

The invention will be further illustrated by reference to the following specific examples in which a cell of the type disclosed in copending application, Serial No. 103,687, filed April 13, 1961, was used and was operated at room temperature, i.e. in the range of about 25 to 28° C. All electrode potentials were measured against a standard calomel electrode and calculated as against a calculated theoretical hydrogen potential. All signs of the electrode potentials are expressed in accordance with the Stockholm Convention. For all cathode potentials the higher plus values indicate better performance.

EXAMPLE I

This example illustrates the effect of carbon dioxide on electrode potentials. Using methanol as a fuel, it was shown that the cathode potential declined after some length of time, this decline occurring at open circuit and even more sharply under load. A typical decline curve is shown in FIGURE 1 of the drawings. Simultaneously, it was observed that the effluent oxygen from the cathode compartment contained some carbon dioxide. This resulted from methanol dissolved in the sulfuric acid diffusing through the ion exchange membrane of the cell into the cathodic electrolyte and, upon contact with oxygen at the electrode, methanol was catalytically oxidized by the platinum catalyst. This oxidation is not electrochemical and, therefore, occurs at open circuit and load operation. The same phenomenon was observed using formic acid vapor as the fuel instead of methanol.

Figure 2:
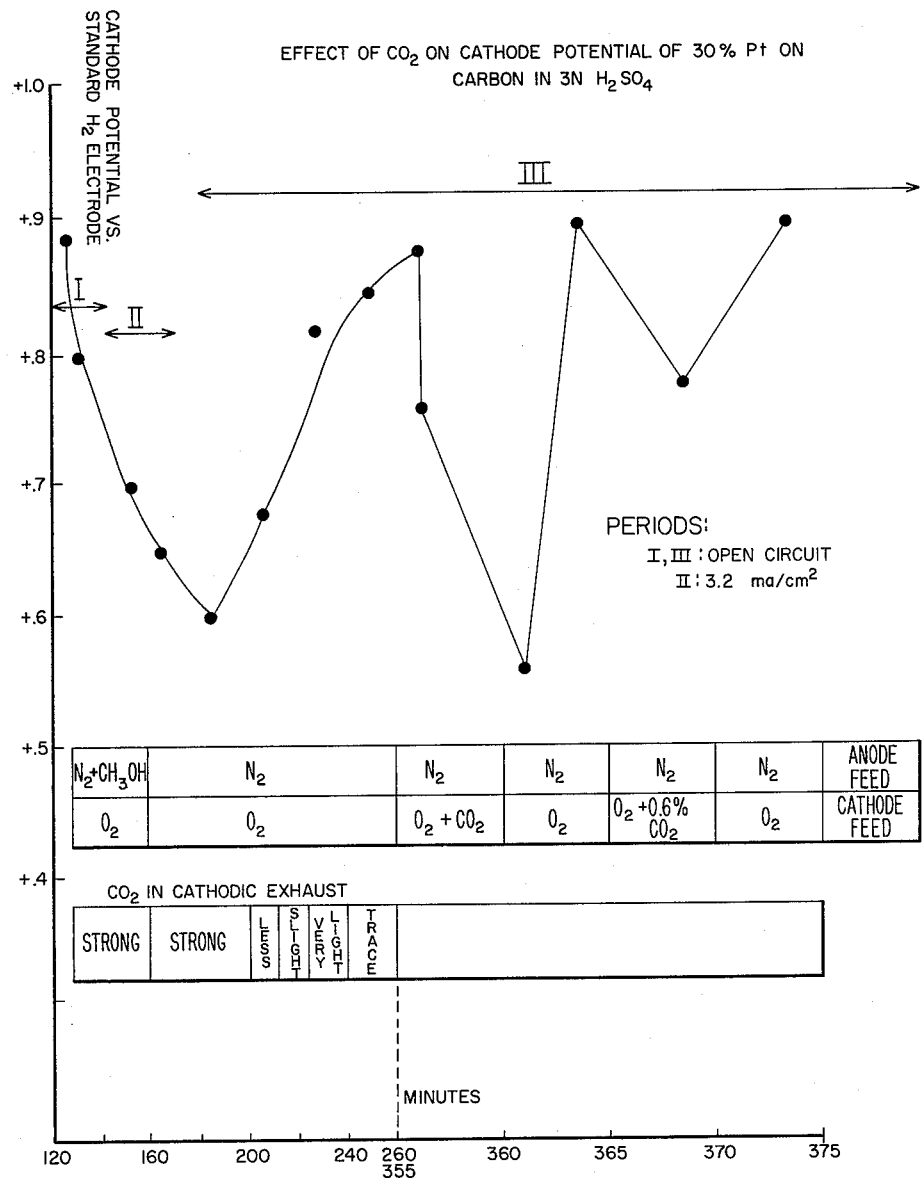

The carbon dioxide appearing at the cathode does not originate at the anode and migrate from there towards the cathode and the evidence that carbon dioxide was the cause of the cathode deactivation is given in the experiment illustrated graphically in FIGURE 2 of the drawings. Methanol vapor was fed with nitrogen to the anode and soon therafter the cathode potential dropped rapidly. The potential drop continued after the methanol addition to the nitrogen had been terminated, and upon feeding pure nitrogen to the anode for 90 minutes, the original cathode potential was restored. During this operation the cathode exhaust was tested qualitatively for the presence of carbon dioxide and the highest rate of carbon dioxide formation coincided with the lowest cathode potentials. At the time of complete potential recovery, there was substantially no carbon dioxide left in the effluent from the cathode compartment. Then, carbon dioxide was added to the oxygen feed of the cathode for a period of 5 minutes and carbon dioxide admitted to the catalyst in this way had a similar effect on the cathode potential as the addition of methanol to the anode, except that the potential recovery was more rapid after discontinuing the addition of carbon dioxide to the oxygen. The difference in recovery rate is explained by the longer times required to eliminate dissolved methanol from the electrolyte by catalytic oxidation at the cathode and the removal of adsorbed carbon dioxide contacting the cathode catalyst from the gas phase.

Carbon dioxide inhibition of the cathode is not limited to platinum and also occurred when palladium was used as a cathodic catalyst, when carbon dioxide was added to the oxygen feed at the cathode.

Inhibition occurs both with blacks of platinum or palladium and with platinum and palladium on supports such as carbon. It is due to the action of carbon dioxide on the precious metals and not to adsorption on the carbon carrier.

A further experiment was made using a concentration of carbon dioxide in oxygen approximately equal to the normal carbon dioxide content of air. On the average, air contains 0.03 volume percent of carbon dioxide. A mixture of oxygen and carbon dioxide was prepared which analyzed 0.048% carbon dioxide instead of 0.03%. Experiments using this mixture as a cathodic feed are graphically illustrated in FIGURE 3 of the drawings. There is a definite indication that at higher current densities, above 20 ma./cm.$^2$, the cathodic polarization with oxygen containing 0.048% carbon dioxide was greater than with pure oxygen. When fuel cells are operated with air and with platinum group metals as catalysts, in acid electrolytes, it is desirable to eliminate the carbon dioxide content of the air, in order to prevent the cathode potential from being adversely effected thereby.

EXAMPLE II

This example illustrates the performance of a platinum group metal catalyst having a low activity for chemical oxidation of a carbonaceous fuel. The cathode catalyst employed was 1% palladium on carbon powder, the electrolyte was 3 N $H_2SO_4$ and the fuel was methanol. The cathodic effluent was passed through a $Ba(OH)_2$ scrubber, to indicate the presence of carbon dioxide, the cell being operated at room temperature. The half cell potential was determined (with reference to a calomel electrode) at alternate periods of open circuit and current generation.

The cathode potentials were calculated against a calculated theoretical hydrogen potential and the results are tabulated in Table I below:

*Table I*

| Reading | Open or closed circuit | Time in, min. | Cathode Potential vs. Theoretical $H_2$ Pot., v. | $CO_2$ Observed at cathode |
|---|---|---|---|---|
| 1 | Open circuit | 5 | +0.913 | None. |
| 2 | ----do---- | 15 | +0.908 | Do. |
| 3 | ----do---- | 25 | +0.908 | Do. |
| 4 | ----do---- | 35 | +0.913 | Do. |
| 5 | ----do---- | 40 | +0.918 | Do. |
| 6 | Closed circuit 5.5 ma./cm.$^2$ | 40 50 | +0.658 | Do. Do. |
| 7 | Open circuit | 50 | | Do. |
| 8 | ----do---- | 65 | +0.918 | Do. |

These data show that no carbon dioxide was observed in the cathode effluent, that there was no decline in the open circuit cathodic potential, and that the open circuit cathode potential recovered.

EXAMPLE III

This example illustrates the cathode performance of a fuel cell, using a carbonaceous fuel, where the fuel is immiscible with the electrolyte.

The cathode catalyst used was 10% platinum on carbon powder and the anode catalyst was 30% platinum on carbon powder. The electrolyte was 1 N $H_2SO_4$. The cell was operated at room temperature with a pure oxygen feed to the cathode, and C.P. benzene vapor carried on nitrogen to the anode. The rate of oxygen feed to the cathode was 50 ml. per minute, while benzene was fed to the anode as follows: a nitrogen stream, fed at the rate of 50 ml. per minute, was pased through a scrubber containing benzene and, being thus saturated with benzene, carried the benzene vapor to the anode.

Figure 4:
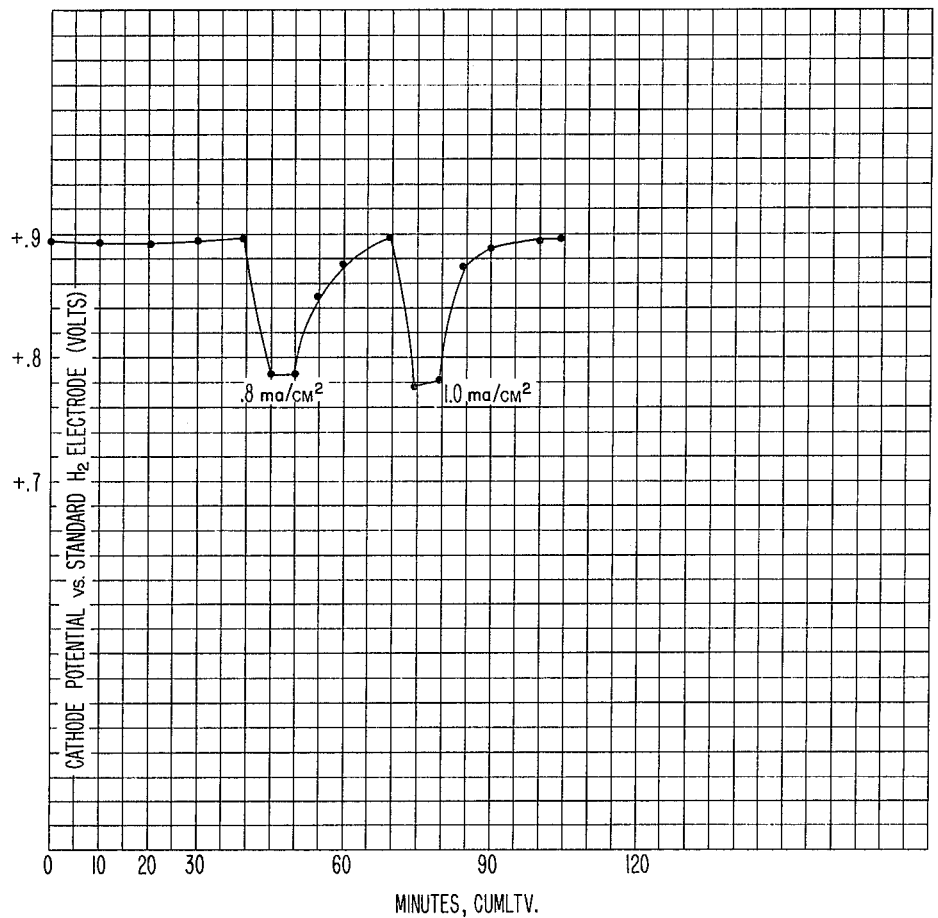
FIGURE 4 is a graph, in which cathode potential is plotted against time in minutes, showing the cathode performance of a fuel cell, using a carbonaceous fuel, where the fuel is immiscible with the electrolyte.

The cathode potential was determined with reference to a standard calomel electrode at alternate periods of open circuit and when the cell was producing current. The results are shown graphically in FIGURE 4 of the drawings, in which the cathode potential is plotted against time in minutes.

The results show that benzene does not have an adverse effect on the cathode potential. The open circuit potential remains constant with time when benzene is fed to the cathode (0–40 minutes); also, after operating the cell to produce current, the cathode potential recovers to the original open circuit potential.

EXAMPLE IV

This example illustrates the use of a fuel which is miscible with the fuel cell electrolyte but which will not oxidize chemically to carbon dioxide at the cathode when the cell is operated at room temperature.

The cathode catalyst used was 10% platinum on carbon powder and the anode catalyst was 30% platinum on carbon powder, the electrolyte being 3 N $H_2SO_4$. The fuel used was glycerin which was mixed into the anolyte prior to assembling the cell. The cell was operated at room temperature with a pure oxygen feed to the cathode.

Figure 5:
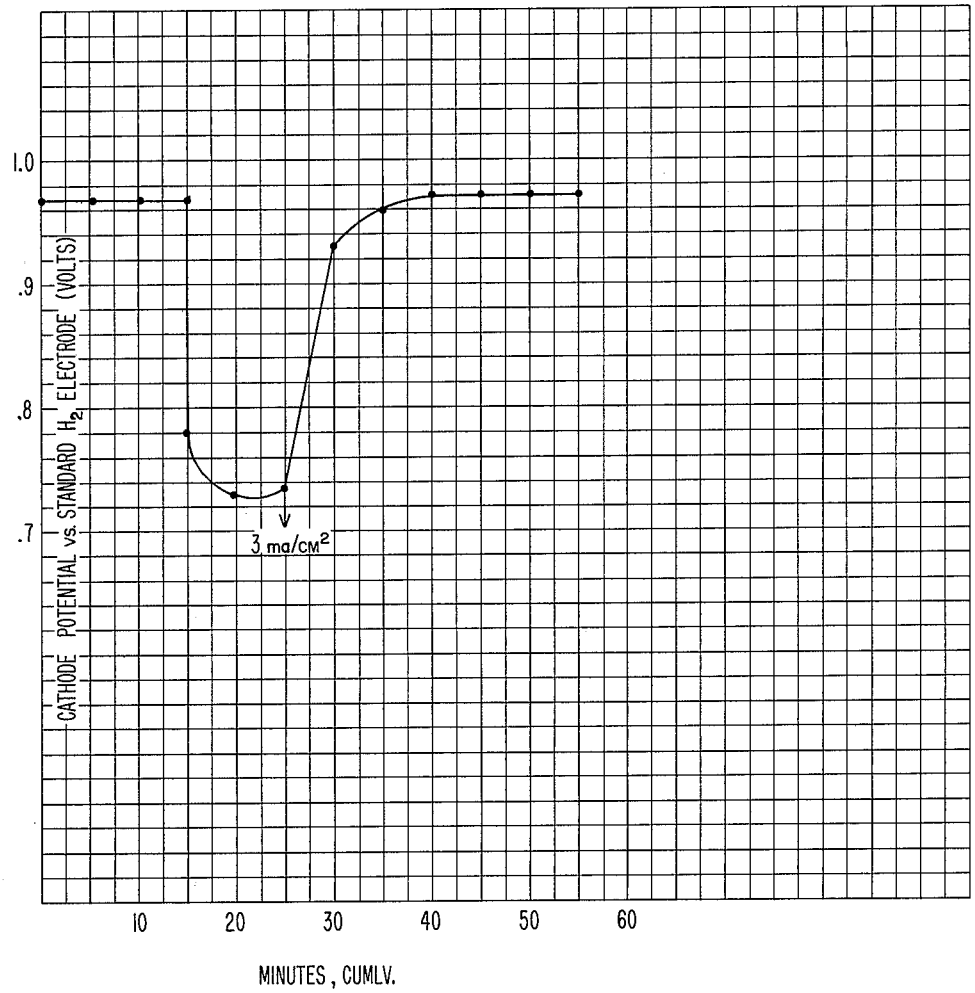
FIGURE 5 is a graph, in which cathode potential is plotted against time in minutes, showing the cathode performance of a fuel cell, where the fuel is miscible with the fuel cell electrolyte but does not oxidize to carbon dioxide at the cathode.

A procedure similar to that in Example III above was followed and the results are shown graphically in FIGURE 5 of the drawings, in which the cathode potential is ploted against time in minutes.

The results show that glycerin when used as a fuel has no adverse effect on the cathode potential. The cathode open circuit potential does not drop with time and it recovers to its original value after the cell has been operated to produce current.

EXAMPLE V

This example illustrates the improved performance of a cathode in a fuel cell when the impurities, including carbon dioxide, are removed from the cathode feed by passage through a material such as Ascarite before it is contacted with the cathode. Since air is the practical source of oxygen for a fuel cell, the effect of carbon dioxide removal is illustrated with air.

In this example, platinum black was used as the catalyst for the anode and the cathode, the electrolyte being 3 N $H_2SO_4$, and hydrogen was used as the fuel. The cell was operated at room temperature with a series of alternating feeds to the cathode as follows:

(1) Pure oxygen
(2) Air passed through Ascarite to remove carbon dioxide before being fed to the cathode
(3) Unpurified air
(4) Same as 1
(5) Same as 2
(6) Same as 3
(7) Same as 1.

This alternating feed technique was used with a view to minimizing any uncertainty which might arise from drift during operation of the cell and which might be a significant factor in view of the small values under consideration.

Polarization data were obtained with the several cathode feeds and the data are plotted graphically in FIGURE 6 of the drawings. The numbers at the points on the graph indicate the sequence in which the measurements were made.

The graph shows that oxygen is superior to air, and that air with carbon dioxide removed by passage through Ascarite before use is superior to atmospheric air in the higher current density range of this test. Although the improved performance of the cathode was slight, the improvement was apparent even though air contains only about 0.03 volume percent of carbon dioxide and the cell was operated at lower current densities than a commercial type cell would be. Projecting this effect to commercial type cells, which will be capable of operating at several hundred ma./cm.$^2$, the presence of even small amounts of carbon dioxide will have a marked effect.

EXAMPLE VI

This example illustrates the cathode performance of a fuel cell using methanol as a fuel and pure oxygen as the oxidant where the cathode catalysts are such that they exhibit a great activity for the chemical oxidation of the fuel as well as for the electrochemical ionization of the oxygen.

In a cell in which the cathode catalyst was 5% gold and 95% platinum black, the anode catalyst platinum black and the electrolyte 3 N $H_2SO_4$, cathode potentials were determined following a procedure similar to that in Example II. Also in accordance with Example II, $CO_2$ present in the cathodic effluent was determined by use of a $Ba(OH)_2$ scrubber.

Similarly, cathode potentials of a cell were determined where the cathode catalyst was 1% lead and 99% platinum black, the anode catalyst was 30% platinum on carbon and the electrolyte was 3 N $H_2SO_4$.

The results are given in Table II.

*Table II*

CATHODE POTENTIALS VS. THEORETICAL HYDROGEN POTENTIALS

Fuel : $CH_3OH$ vapor in $N_2$
Oxidant : Pure $O_2$
Electrolyte : $3NH_2SO_4$
Conditions :
  Room temperature feed rate=50 ml. gas/minute at the cathode and anode

| Cell I [1] Cathode Catalyst: 5% Au and 95% Pt Black. Anode Catalyst: Pt Black. | | | Cell II [2] Cathode Catalyst: 1% Pb and 99% Pt Black. Anode Catalyst: 30% Pt on Carbon | | |
|---|---|---|---|---|---|
| Time in Min. | Current Density, ma/cm.$^2$ | Cathode Pot., Volts | Time in Min. | Current Density, ma/cm.$^2$ | Cathode Pot., Volts |
| 5 | 0 | +1.090 | 5 | 0 | +1.000 |
| 10 | 0 | +1.060 | 10 | 0 | +1.000 |
| 25 | 1.0 | +0.920 | 15 | 0 | +0.986 |
| 35 | 0 | +0.925 | 20 | 0 | +0.950 |
| 45 | 2.0 | +0.910 | 25 | 1.6 | +0.910 |
| 55 | 0 | +0.930 | 35 | 0 | +0.930 |
| 65 | 3.0 | +0.910 | 40 | 0 | +0.930 |
| 75 | 0 | +0.935 | 60 | 8.0 | +0.840 |
| 85 | 4.1 | +0.910 | 80 | 0 | +0.935 |
| 95 | 0 | +0.940 | | | |
| 105 | 6.1 | +0.910 | | | |
| 115 | 0 | +0.950 | | | |
| 125 | 7.1 | +0.910 | | | |
| 135 | 0 | +0.960 | | | |
| 145 | 8.1 | +0.910 | | | |
| 155 | 0 | +0.955 | | | |

[1] The presence of a relatively substantial amount of $CO_2$ was first detected after about 25 minutes.
[2] The presence of a relatively substantial amount of $CO_2$ was first detected after about 20 minutes.

For comparison, the cathode potentials determined in a similar cell, using platinum black as the catalyst for the cathode and the anode, are given in Table III. No load was applied to the cell. The presence of $CO_2$ was first detected after 20 minutes.

Table III

OPEN CIRCUIT CATHODE POTENTIAL VS. THEORETICAL HYDROGEN POTENTIAL

Fuel: $CH_3OH$ vapor in $N_2$
Oxidant: Pure $O_2$
Electrolyte: $3NH_2SO_4$
Conditions:
    Room temperature feed rate=50 ml. gas/minute at the cathode and anode

| Time in Minutes: | Cathode Pot., Volts |
|---|---|
| 5 | +1.020 |
| 10 | +0.980 |
| 20 | +0.960 |
| 30 | +0.940 |
| 40 | +0.910 |
| 50 | +0.870 |

The data in Table II show that although there was evidence of a relatively substantial amount of carbon dioxide present at the cathode in cell I and cell II, there was no detrimental effect on the cathode potentials on open circuit or under load, and the cells recovered after generating current, whereas Pt Black alone (Table III) showed a decline of the open circuit potential subsequent to the detection of $CO_2$ in the effluent gas from the cathode.

The present invention specifically relates to those fuel cells employing electrolytes containing no free base. Where there is free base present in the electrolyte, the small amount of carbon dioxide reacts with the free base and there is no evidence that there is any carbon dioxide remaining which can reach the cathode.

It will be obvious to those skilled in the art that many modifications may be made within the scope of the present invention without departing from the spirit thereof, and the invention includes all such modifications.

What is claimed is:

1. In a method for operating a fuel cell having a platinum group metal cathode catalyst and an electrolyte containing no free base wherein the electrochemical oxidation of a fuel is effected by introducing an oxidant comprising oxygen-containing gas normally including a connate carbon dioxide impurity into contact with said cathode and electrolyte, the improvement which comprises removing said carbon dioxide from the said oxygen-containing gas prior to such contacting.

2. The improved method of claim 1 wherein the electrolyte is an aqueous solution of sulfuric acid.

3. The improved method of claim 1 wherein the oxygen-containing gas is air.

References Cited by the Examiner

UNITED STATES PATENTS

| | | | |
|---|---|---|---|
| 2,384,463 | 9/1945 | Gunn et al. | 136—86 |
| 3,080,440 | 3/1963 | Ruetschi et al. | 136—86 |
| 3,098,762 | 7/1963 | Roblee et al. | 136—86 |
| 3,113,049 | 12/1963 | Worsham | 136—86 |

ALLEN B. CURTIS, *Primary Examiner.*

JOHN R. SPECK, JOHN H. MACK, *Examiners.*